US008856860B2

(12) United States Patent
Grayson et al.

(10) Patent No.: US 8,856,860 B2
(45) Date of Patent: Oct. 7, 2014

(54) SYSTEM AND METHOD FOR IMPLEMENTING POLICY SERVER BASED APPLICATION INTERACTION MANAGER

(75) Inventors: Mark Grayson, Maidenhead (GB); Jonathan D. Rosenberg, Freehold, NJ (US)

(73) Assignee: Cisco Technology, Inc., San Jose, CA (US)

( * ) Notice: Subject to any disclaimer, the term of this patent is extended or adjusted under 35 U.S.C. 154(b) by 1248 days.

(21) Appl. No.: 11/840,502

(22) Filed: Aug. 17, 2007

(65) Prior Publication Data

US 2008/0046963 A1 Feb. 21, 2008

Related U.S. Application Data

(60) Provisional application No. 60/822,776, filed on Aug. 18, 2006.

(51) Int. Cl.
*H04L 29/06* (2006.01)
*H04L 29/08* (2006.01)
*H04L 12/66* (2006.01)

(52) U.S. Cl.
CPC .............. *H04L 67/322* (2013.01); *H04L 12/66* (2013.01)
USPC .......................................................... 726/1

(58) Field of Classification Search
USPC .......................................................... 726/1
See application file for complete search history.

(56) References Cited

U.S. PATENT DOCUMENTS

| | | | | |
|---|---|---|---|---|
| 5,381,552 A | * | 1/1995 | Dahlberg et al. | 710/264 |
| 5,956,039 A | * | 9/1999 | Woods et al. | 345/419 |
| 6,332,163 B1 | | 12/2001 | Bowman-Amuah | 709/231 |
| 6,519,571 B1 | | 2/2003 | Guheen et al. | 705/14 |
| 6,661,780 B2 | | 12/2003 | Li | 370/324 |
| 6,880,005 B1 | * | 4/2005 | Bell et al. | 709/225 |
| 2004/0143663 A1 | * | 7/2004 | Leedom et al. | 709/226 |
| 2004/0218607 A1 | * | 11/2004 | Hurtta et al. | 370/395.21 |
| 2004/0268150 A1 | * | 12/2004 | Aaron | 713/201 |
| 2005/0050363 A1 | * | 3/2005 | Naka et al. | 713/201 |
| 2005/0122945 A1 | | 6/2005 | Hurtta | 370/338 |
| 2006/0123477 A1 | * | 6/2006 | Raghavan et al. | 726/22 |
| 2007/0136785 A1 | * | 6/2007 | Warrier et al. | 726/2 |
| 2008/0310301 A1 | * | 12/2008 | Wade et al. | 370/230 |

OTHER PUBLICATIONS

"3rd Generation Partnership Project; Technical Specification Group Services and System Aspects; Telecommunication management; Charging management; Charging architecture and principles (Release 6)," 3GPP TS 32.240 V6.0.0, *3GPP™*, Sep. 2004, 38 pages.

(Continued)

*Primary Examiner* — Michael S McNally
(74) *Attorney, Agent, or Firm* — Baker Botts L.L.P.

(57) ABSTRACT

In one example embodiment, an apparatus includes a policy repository for storing a policy for application interaction. The policy defines, for a subscriber, a priority associated with a set of specific application identifiers. The priority further defines establishment priority and retention priority for an application identified by a selected application identifier. Another example embodiment includes an apparatus including a processor operable to evaluate a policy for application interaction. The policy defines, for a subscriber, a priority associated with a set of specific application identifiers. The priority further defines establishment priority and retention priority for an application identified by a selected application identifier. The processor is further operable to execute a decision for the subscriber based on the evaluation of the policy.

18 Claims, 7 Drawing Sheets

(56) References Cited

OTHER PUBLICATIONS

"IP Multimedia Subsystems (IMS); Stage 2 (Release 5)," ARIB STD-T63-23.228 V5.13.0, , *3GPP™*, Dec. 2004, 132 pages.
"3rd Generation Partnership Project; Technical Specification Group Services and System Aspects; Overall high level functionality and architecture impacts of flow based charging; Stage 2 (Release 6)," 3GPP TS 23.125 V6.8.0, , *3GPP™*, Mar. 2006, 49 pages.
"3rd Generation Partnership Project; Technical Specification Group Services and System Aspects; Identification of Communication Services in IMS (Release 7)," 3GPP TR 23.816 V7.0.0, *3GPP™*, Mar. 2006, 15 pages.
"Policy and charging control architecture (Release 7)," ARIB STD-T63-23.203 V7.2.0, , *3GPP™*, Mar. 2007, 73 pages.
"3rd Generation Partnership Project; Technical Specification Group Service and System Aspects; Telecommunication management; Charging Management; Online Charging System (OCS): Applications and interfaces (Release 6)," 3GPP TS 32.296 V6.3.0, , *3GPP™*, Sep. 2006, 63 pages.
"PCC changes to support a DOCSIS broadband access network," 3GPP TSG SA WG2 Architecture—S2#51, *3GPP™*, Feb. 13-17, 2006, 4 pages.
"Motivations for Alternative NAT Traversal Approach," 3GPP TSG SA WG2 Architecture—S2#52, 3GPP TSG SA WG2 Architecture—S2#52, *3GPP™*, May 8-12, 2006, 7 pages.
"IMS Communication Service Identifier in PCC," 3GPP TSG SA WG2 Architecture—S2#53, *3GPP™*, Jun. 26-30, 2006, 4 pages.

* cited by examiner

SYSTEM AND METHOD FOR IMPLEMENTING POLICY SERVER BASED APPLICATION INTERACTION MANAGER

RELATED APPLICATIONS

This application claims priority under 35 U.S.C. §119 of U.S. Provisional Application No. 60/822,776, filed Aug. 18, 2006.

TECHNICAL FIELD OF THE INVENTION

This invention relates generally to the field of communications and, more particularly, to a policy server based application interaction manager.

BACKGROUND OF THE INVENTION

A policy server is able to modify the behavior of applications by sending an application behavior modifier (ABM) to an application function. Such a scheme can be used to manage the interactions between a plethora of applications, and the resources needed to support such applications. 3rd Generation Partnership Project (3GPP) Policy Charging Convergence defines the support of application identifiers in a service request between an application function and a policy, and, further, the charging rules function.

Since the introduction of prioritization, an additional level of policy granularity has been introduced, which allows differentiation between session related information provided by an Application Function (AF) application identifier and an AF Communication Service Identifier. Effectively coordinating these functions and features presents a significant challenge for designers, administrators, and developers alike.

BRIEF DESCRIPTION OF THE DRAWINGS

For a more complete understanding of the presently described embodiments and their advantages, reference is now made to the following description, taken in conjunction with the accompanying drawings, in which.

DESCRIPTION OF EXAMPLE EMBODIMENTS

Overview

In an example embodiment, an apparatus includes a policy repository for storing a policy for application interaction. The policy defines, for a subscriber, a priority associated with a set of specific application identifiers. The priority further defines establishment priority and retention priority for an application identified by a selected application identifier.

Another example embodiment includes an apparatus including a processor operable to evaluate a policy for application interaction. The policy defines, for a subscriber, a priority associated with a set of specific application identifiers. The priority further defines establishment priority and retention priority for an application identified by a selected application identifier. The processor is further operable to execute a decision for the subscriber based on the evaluation of the policy.

Description

In at least one embodiment, per subscriber policy for application interaction is stored in a policy repository. This per subscriber policy defines a priority associated with specific application identifiers. The priority further defines an establishment priority and retention priority for an application identified by an application identifier. The establishment and retention priorities may be further qualified with bearer specific attributes. For example, in a particular embodiment, application identifier #1 has an establishment priority of 0.9 when a bearer is provided by UMA based WiFi coverage, application identifier #2 has a retention priority of 0.2 when a user is located in cell identity #A. The policy may further define limits on the simultaneous bearers, which are authorized to be activated by the subscriber. The policy may further define bandwidth limits per access type, e.g., 50 kbit/s maximum on General Packet Radio Service (GPRS), 100 kbit/s on Universal Mobile Telecommunications System (UMTS) and 500 kbit/s on High Speed Packet Data Access (HSDPA).

Figure 1:
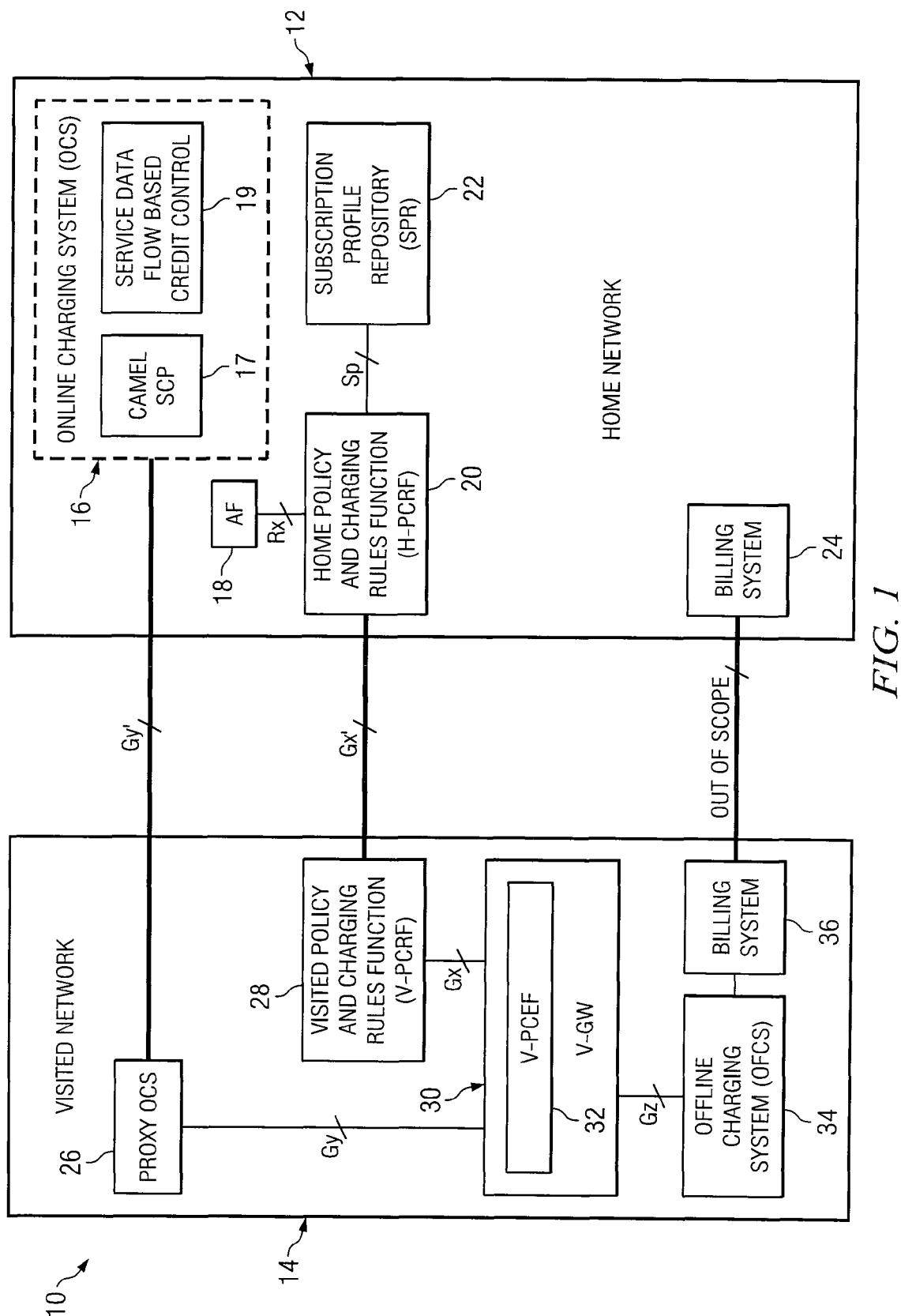
FIG. 1 is a simplified block diagram of an embodiment of a system for policy and charging control (PCC) for roaming users of services accessed via a visited network gateway.

FIG. 1 is a simplified block diagram of an embodiment of a system 10 for policy and charging control (PCC) for roaming users of services accessed via a visited network gateway. The system 10 includes a home network 12 coupled to a visited network 14. In a particular embodiment, the home network 12 is a Home Public Land Mobile Network (HPLMN) and the visited network is a Visited Public Land Mobile Network (VPLMN). The home network 12 includes an online charging system (OCS) 16. The online charging system (OCS) 16 includes a customized applications for mobile network enhanced logic (CAMEL) service control point (SCP) 17 and a Service Data Flow Based Credit Control 19. The home network 12 further includes an application function (AF) 18, a home policy and charging rules function (H-PCRF) 20, a subscription profile repository (SPR) 22, and a billing system 24.

The visited network 14 includes a proxy online charging system (OCS) 26, a visited policy and charging rules function (V-PCRF) 28, a visited gateway (V-GW) 30. The visited gateway (V-GW) 30 further includes a visiting policy and charging enforcement function (V-PCEF) 32. The visited network 14 further includes an offline charging system (OFCS) 34, and a billing system 36.

An interface is defined between a policy enforcement function and a policy decision function. When the policy enforcement function observes a new IP session, the policy enforcement function will establish a policy session with the policy function, providing the user's asserted identity and IP address in the session establishment. The technique used by the policy enforcement function for obtaining the asserted identity of the user may be any suitable technique, e.g., by using a shared secret to send a random challenge to the user and comparing the response with the one expected given the stored shared secret, random challenge and security algorithm. When establishing a session between the policy enforcement function and the policy decision function, and repeatedly throughout the duration of the session, the policy enforcement function may provide link layer attributes to the policy decision function, e.g., radio access technology currently being used, round trip delay, network identifier, as and when these attributes change. Examples of such procedures are defined in 3GPP TS 23.203.

In various embodiments, an interface is defined between the policy repository and a policy decision function. When the policy function receives a request to establish a policy session with a gateway for a subscriber, the policy decision function contacts the policy repository, including the asserted identity of the subscriber. The policy repository then downloads a local copy of the subscriber's policy into the policy decision function, including application identifiers, priorities, authorized bandwidth, etc.

Following IP session establishment, the user will interact with a plethora of application functions. These application functions may require that policy be implemented on their behalf. If policy is required to be implemented, the application function will establish a session with the policy decision function requesting policy to be implemented for an observed IP address. The technique by which the session is established could include the application function being pre-configured with an address of a gateway policy function which then consults a database containing a mapping between logical policy decision functions and enforceable IP addresses in order to recover the address of the correct policy decision function and then either proxying or redirecting the session request towards the appropriate policy decision function which is controlling the flows associated with the requested IP address. The application function will include application identifying information in its request for having policy implemented.

Given the above described environment, various embodiments relate to the operation of a policy decision function. In at least one embodiment, when a policy decision function receives a request for policy implementation from an application function, it first consults the local version of the subscriber policy to see whether the application is authorized. Unauthorized applications may either have their identities absent from the policy or have an establishment priority of 0. If the application isn't authorized, the policy implementation request is rejected and an appropriate cause is provided to the application function.

If the application is authorized (is listed with an establishment priority>0), then any priority qualifiers are checked, e.g., priority=0 for GPRS and priority=0.5 for HSDPA. The policy decision function consults its dynamic policy context built using information provided by the policy enforcement function and any other systems. If the priority fails because of qualification, the policy decision function rejects the request for policy implementation but provides a cause indicating that this was due to dynamic state and that a similar request may succeed at a later date, e.g., if the state associated with the qualification changes. The application function may then select to subscribe to an events package which publishes updates concerning the users state.

If the request passes the qualification stage, the policy decision function then compares the requested bearer characteristics with its cumulative authorized bearer characteristics for a particular subscriber. For example, the policy implementation request may request 100 kbit/s and the authorized cumulative bandwidth for the user is 50 kbit/s. Alternatively, the request may be for 60 kbit/s and the user is currently on GPRS where the cumulative bandwidth is restricted to 50 kbit/s. In such cases the policy decision function rejects the policy implementation request and provides an appropriate reject cause to the requesting application function.

Now the policy decision knows that the bearer characteristics are within the subscribers profile. The policy decision function then compares the request with the currently established bearer characteristics. For example, if the request is for 20 kbit/s, the user currently has an authorized limit of 100 kbit/s and 80 kbit/s of already established bearers, then the policy decision function determines that it is authorized to make a request to the policy enforcement function for policy implementation.

However, if the request together with the already established bearer characteristics exceed the authorized limits, the policy decision function then uses the priorities to implement function interactions. The policy decision function uses the application identifier provided by the application function to determine the establishment priority for the application and compares this with the retention priorities for already established policies. If the establishment priority is lower than all retention priorities then the request is rejected.

If the establishment priority is greater than one or more retention priorities, then the policy decision function calculates whether the pre-emption of all policies related to lower retention priorities when compared with the requested establishment priority will enable the policy to be implemented whilst meeting the cumulative authorized bearer characteristics. For example, if the cumulative bandwidth authorized is 100 kbit/s, the current policy request is from application #D for 50 kbit/s with an establishment priority of 0.7, whereas there are already established policies supporting application #A corresponding to 30 kbit/s with a retention priority of 0.4, application #B corresponding to 40 kbit/s with a retention of 0.8 and application #C corresponding to 10 kbit/s with a retention priority of 0.5, then the policy decision function can determine that by preempting application #A and #C, that the request from application #D can be supported.

In such a situation, the policy decision function signals to the application functions that requested the establishment of policy for application #A and #C that previous committed policies can no longer be met, and signals the policy enforcement function to remove those policies.

When the policy decision function requires new policies to be enforced, it contacts the policy enforcement point which enforces the policy for the required subscriber. The policy will include the required bearer characteristics. The policy enforcement function will attempt to implement such policies and will respond to the policy decision function when policies have been correctly implemented. At this point the policy decision function can update its view of the cumulative bearer characteristics in use by a particular subscriber.

If the policy enforcement function is unable to implement the requested policy, the policy function may also be operable to provide a hint as to the bearer characteristics which could be enforced. For example, if the policy enforcement point interacts with an access network and determines that current traffic restrictions mean that GPRS traffic is restricted to 40 kbits/s per user even though the policy repository has this listed as 50 kbit/s and the current request for policy would mean that this total is exceed, then the policy enforcement function can provide an indication to the policy decision function that current cumulative bearer characteristics are restricted to a certain level.

When receiving such a message, the policy decision function may be further operable to determine as previously whether any established policies will be pre-empted by the new policy.

When application state means that required policies no longer need to be implemented, the application function will be responsible for signaling such to the policy decision function. The policy decision function will be responsible for signaling the policy enforcement function and updating its cumulative bearer characteristics accordingly.

In one example embodiment, an apparatus is provided that includes a per subscriber policy for application interaction being stored in a policy repository, the policy defining a priority associated with a set of specific application identifiers.

The online charging system (OCS) 16 (including the SCP 16 and Service Data Flow Based Credit Control 19) maintains credit information associated with one or more users of the home network 12, and responds to requests for the credit information. The Service Data Flow Based Credit Control Function 19 is a functional entity within the OCS 16 that performs online credit control functions. The OCS 16 may further apply different rates and charging models when a user is identified to be roaming from when the user's home network. The OCS 16 may further apply different rates and charging models based on a location of a user, a specific service requested by the user, a time of day, a Quality of Service (QoS) provided for a service.

In various embodiments, credit management applies for online charging and operates on a per charging key basis. In at least one embodiment, the PCEF supports credit management on a per IP-CAN bearer basis. Independent credit control for an individual service data flow may be achieved by assigning a unique charging key value for the service data flow in the PCC rule. In some embodiments, the PCEF requests a credit for each charging key occurring in a PCC rule that is active for a IP-CAN bearer. The OCS 16 may either grant or deny the request for credit. In some embodiments, the OCS strictly controls rating decisions. It should be understood that the term 'credit' as used here does not necessarily imply actual monetary credit, but may be an abstract measure of resources available to the user. The relationship between this abstract measure, actual money, and actual network resources or data transfer, may controlled by the OCS 16 in various embodiments.

In some embodiments, the OCS 16 may form a credit pool for multiple (one or more) charging keys, applied at the PCEF, with the objective of avoiding credit fragmentation. Multiple pools of credit may be allowed per IP-CAN bearer. In such embodiments, the OCS 16 may control credit pooling decisions. When credit authorization is sought, the OCS 16 may either grant a new pool of credit together with a new credit limit, or give a reference to a pool of credit that is already granted for a particular IP-CAN bearer. In some embodiments, the grouping of charging keys into pools does not restrict the ability of the OCS 16 to do credit authorization and provide termination action individually for each charging key of the pool. In various embodiments, the OCS 16 groups service data flows charged at different rates or in different units (e.g. time/volume) into the same pool.

For each charging key, the PCEF may receive credit re-authorization trigger information from the OCS, which causes the PCEF to perform a credit re-authorization when the event occurs. The credit re-authorization trigger detection causes the PCEF to request re-authorization of the credit in the OCS 16. In various embodiments, the OCS 16 may instruct the PCEF to seek re-authorization of credit in case of the events listed in Table 1.

TABLE 1

Credit re-authorization Triggers

| Credit re-authorization trigger | Description |
| --- | --- |
| Credit authorisation lifetime expiry | The OCS has limited the validity of the credit to expire at a certain time. |
| Idle timeout | The service data flow has been empty for a certain time. |
| PLMN change | The UE has moved to another operators' domain. |
| QoS changes | The QoS of the IP-CAN bearer has changed. |

In some embodiments, some re-authorization triggers are related to IP-CAN bearer modifications. IP-CAN bearer modifications, which do not match any credit re-authorization trigger (received from the OCS 16 for the bearer) do not cause any credit re-authorization interaction with the OCS 16.

In various embodiments, the PCEF receives information from the H-PCRF 20 that define the conditions when the PCEF interacts again with H-PCRF 20 after an IP-CAN bearer establishment. The event triggers are provided by the H-PCRF 20 to the PCEF using a Provision of PCC Rules procedure. In some embodiments, event triggers are associated with PCC rules of an IP-CAN session, and event triggers determine when the PCEF signals to the H-PCRF 20 that an IP-CAN bearer has been modified. In various embodiments, the H-PCRF 20 instructs the PCEF to react to an event triggers. Examples of event triggers are listed in Table 2.

TABLE 2

Event Triggers

| Event trigger | Description |
| --- | --- |
| PLMN change | The UE has moved to another operators' domain. |
| QoS change (all or exceeding authorization only) | The QoS of the IP-CAN bearer has changed. Two settings shall be possible: all changes of the QoS or only those that exceed the authorized QoS. |
| Traffic mapping information change | The traffic mapping information of the IP-CAN bearer has changed. |
| Change in type of IP-CAN | The access type of the IP-CAN bearer has changed. |

In at least one embodiment, IP-CAN bearer modifications which do not match any event trigger cause no interaction with the PCRF.

In one example embodiment, a QoS change event trigger allows two different settings. A first setting triggers PCRF interaction for all changes of the IP-CAN bearer QoS. A second setting triggers PCRF interaction for only those changes that exceed QoS of an IP-CAN bearer that has been authorized by the PCRF previously. In one embodiment, the QoS parameters of the IP-CAN bearer that have to be checked by the PCEF against a change include a bandwidth and a QoS class.

The AF 18 provides applications that require dynamic policy and/or charging control. In various embodiments, the AF 18 may communicate with the H-PCRF 20 to transfer dynamic session information required for PCRF decisions as well as receive IP-Connectivity Access Network (IP-CAN) specific information and notifications about IP-CAN bearer level events.

The Home-Policy Control and Charging Rules Function (H-PCRF) 20 provides policy control decision and flow based charging control functionalities. In accordance with various embodiments, the H-PCRF 20 provides network control regarding service data flow detection, gating, QoS and flow based charging (except credit management) towards the policy and charging enforcement function (PCEF). In further embodiments, the H-PCRF 20 may apply any security procedures required by the operator before accepting service information from the AF 18. In various embodiments, the H-PCRF 20 decides how a certain service data flow shall be treated in the PCEF, and ensure that PCEF user plane traffic mapping and treatment is in accordance with a user's subscription profile.

In various embodiments, the H-PCRF 20 may check that the service information provided by the AF 18 is consistent with both operator defined policy rules and related subscription information received from the SPR 22 during IP-CAN session establishment before storing the service information. In some embodiments, the service information may be used to derive the QoS for the service. In various embodiments, the H-PCRF 20 may reject the request received from the AF 18 when the service information is not consistent with either the related subscription information or the operator defined policy rules. As a result, the H-PCRF 20 may indicate that the service information is not covered by the subscription information, or may indicate, in a response to the AF, that the service information can be accepted by the H-PCRF 20. In the absence of other policy control mechanisms outside the scope of PCC, the H-PCRF 20 may include this information in the response.

In various embodiments, the H-PCRF 20 authorizes QoS resources. In such an embodiment, the H-PCRF 20 uses service information received from AF 18 (e.g. SDP information or other available application information) and/or the subscription information received from the SPR 22 to calculate the proper QoS authorization (such as QoS class identifier and bitrate). In still other embodiments, the H-PCRF 20 may also into take account a requested QoS received from the V-PCEF 20 via Gx' interface. The H-PCRF 20 may use the subscription information as basis for policy and charging control (PCC) decisions. In various embodiments, the subscription information may apply for both session based and non-session based services.

In accordance with at least one embodiment, the H-PCRF 20 is able to perform at least one of the following: distinguish between policy and charging sessions for roaming users and home users (e.g., based on the domain which originated a request); receive an indication from the V-PCRF 28 regarding on-line charging support for roaming users; reject any request for Policy and Charging rules from a visited network 14 if subscriber profile requirements cannot be met; provide a charging key to the V-PCRF 28; provide an OCS identifier to the V-PCRF 28 if on-line charging in the visited network 14 is used.

The SPR 22 includes one or more databases that store subscriber/subscription related information needed for subscription-based policies and IP-CAN bearer level PCC rules by the PCRF. In various embodiments, the SPR 22 may be combined with or distributed across other databases in the operator's network. Examples of subscriber/subscription related information that may be stored in the SPR 22 include subscriber's allowed services, pre-emption priority information (such as establishment and retention priority) for each allowed service, information related to subscriber's allowed QoS, subscriber's charging related information (e.g., location information relevant to charging), and subscriber category. In accordance with various embodiments, the SPR 22 may provide subscription profile information include a subscriber's roaming charging requirements, including whether roaming access is denied if on-line charging for roaming subscribers is not supported by the visited network 14. In various embodiments, the SPR 22 includes a policy repository in which a per subscriber policy for application interaction is stored, the policy defining a priority associated with a set of specific application identifiers.

The proxy OCS 26 provides proxying of credit control requests and responses between the V-PCEF 32 and the OCS 16 in the home network 12. In at least one embodiment, the proxy OCS 16 recovers information in requests received from the V-PCEF 32 in order to determine a destination identity and realm of the OCS 16 in the home network 12.

The V-PCRF 28 determines an identity of H-PCRF 20 from information provided by the V-PCEF 32 in at least one embodiment. In various embodiments, the V-PCRF 28 provides proxying of requests and responses between the V-GW 30 and the H-PCRF 20. In at least one embodiment, the V-PCRF 28 includes, in a request towards the H-PCRF 20, information indicating that the visited network 14 supports on-line charging for roaming users. In various embodiments, the V-PCEF 28 receives an OCS identifier from the H-PCRF 20, and sends the OCS identifier to the V-PCEF 32 in one or more messages.

In at least one embodiment, the V-PCEF 32 performs a function of including a user identity in any request for policy and charging rules, and provides the user identity to the V-PCRF 28, thus enabling the V-PCRF 28 to identify the home network 12. In at least one embodiment, the user identity is an International Mobile Subscriber Identity (IMSI). In various embodiments, the V-PCEF 32 receives an OCS identifier from the V-PCRF 28, and sends the OCS identifier to the proxy OCS 26 in credit control messages.

The OFCS 34 includes a charging mechanism to handle charging processes in which the charging information does not affect the services rendered in real-time. In various embodiments, a default OFCS addresses (i.e. a primary address and a secondary address) is locally pre-configured within the V-PCEF 32. In some embodiments, OFCS addresses may also be passed once per IP-CAN session from the V-PCRF 28 to the V-PCEF 32. In at least one embodiment, the addresses provided by the V-PCRF 28 have a higher priority than addresses pre-configured within the V-PCEF 32.

The billing system 24 and the billing system 36 process charging events occurring in the home network 10 and the visited network 14, respectively, and produce a billing output. In accordance with one embodiment, the billing output includes one or more customer invoices.

In an example embodiment, modification of the Gx protocol is made in order to provide policy and charging control between V-PCRF 28 and H-PCRF 20 to allow use, by a roaming user, of services accessed via a V-GW 30 in the visited network 14. In accordance with this embodiment, reporting level of service usage within the visited network 14 is based on a charging key provided by the home network 12. Account balance management functions are also provided by the home network 12.

In at least one embodiment, Policy and Control Enforcement Function for roaming users is provided by the V-PCEF 32 and is logically independent from the Policy and Control Enforcement for home users that is natively provided by the home network 10. In various embodiments, the separation PCEF provided by V-PCEF 32 from native PCEF functionality provided in the home network 12 may be achieved using IP-CAN specific mechanisms. Examples of IP-CAN specific mechanisms include Access Point Name (APN) or Wireless Local Area Networking-Access Point Name (W-APN) in the case of General Packet Radio Service (GPRS) or Integrated Wireless Local Area Networking (I-WLAN). The interface between the V-PCRF 28 and H-PCRF 20 is based on an enhanced Gx protocol, Gx'. Accordingly, the V-PCRF 28 provides interworking with the V-PCEF 32 using the between the Gx protocol and to the H-PCRF using the Gx' protocol.

In an embodiment, subscription profile information for a visiting user is located in the home network 12. In at least one embodiment, the subscription profile information for a user is stored in the SPR 22. In a typical embodiment, the home network 12 provides sufficient subscription information so that the appropriate PCC rules can be provisioned to the visited GW 30. This may includes providing information to identify PCC rules at bearer or access point level. However, in various embodiment, the home network 12 may not be unable to provide detailed enough subscription information for the visited network 14 to construct service flow based rules. In such cases, charging parameters (e.g. charging method and OCS/OFCS addresses) may be provided only at bearer or access point level.

In at least one embodiment of the system 10 of FIG. 1, the H-PCRF 20 determines whether a PCC rule needs to be implemented on V-PCEF 28 or by the PCEF provided in the home network 12. In at least one embodiment, predefined PCC rules that are not part of a roaming agreement for a roaming user are not dynamically activated by the H-PCRF 20. For example, if a service data flow in the home network 12 would use a dynamically activated pre-defined PCC rule that is not contained in the roaming agreement, then this service data flow will use a different PCC rule in the visited network 14 than would be used in the home network 12. In accordance with some embodiments, a communication link between the V-PCRF 28 and H-PCRF 20 to support online charging while a user is roaming in the visited network 14.

In one embodiment, the visited network 14 indicates to the home network 12 that on-line charging is supported for roaming subscribers. In another embodiment, the home network 12 indicates to the visited network 14 that on-line charging is required for a particular IP-CAN session. In still another embodiment, the visited network 14 discovers the identity of OCS 16 to which credit control messages will be sent from the visited network 14. In other embodiments, the home network 12 indicates to the visited network 14 that a charging key is to be used for service data flow.

Although the present embodiments have been described in detail with reference to particular embodiments, system 10 may be extended to any scenario in which it is desirable to implement policy and/or charging control for a roaming user. This may also be extended to any other network signaling protocols to achieve the teachings of the present embodiments. Moreover, significant flexibility is provided by system 10 in that any suitable one or more components may be replaced with other components that facilitate their operations, as outlined herein.

Software and/or hardware may reside in system 10 in order to achieve the teachings of the features of the present embodiments. Note that, due to their flexibility, these components may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of the components in the context of system 10 and, accordingly, they should be construed as such.

It should be noted that the internal structure of the system of FIG. 1 is versatile and can be readily changed, modified, rearranged, or reconfigured in order to achieve its intended operations or additional operations. Additionally, any of the items within FIG. 1 may be combined, where appropriate, or replaced with other functional elements that are operable to achieve any of the operations described herein.

A component of system 10 may include any suitable arrangement of elements, for example, an interface, logic, memory, other suitable element, or a combination of any of the preceding. An interface receives input, sends output, processes the input and/or output, performs other suitable operation, or performs a combination of any of the preceding. An interface may comprise hardware and/or software.

Logic performs the operations of the component, for example, executes instructions to generate output from input. Logic may include hardware, software, other logic, or a combination of any of the preceding. Certain logic, such as a processor, may manage the operation of a component. Examples of a processor include one or more computers, one or more microprocessors, one or more applications, other logic, or a combination of any of the preceding.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable medium, or a combination of any of the preceding.

Figure 2:
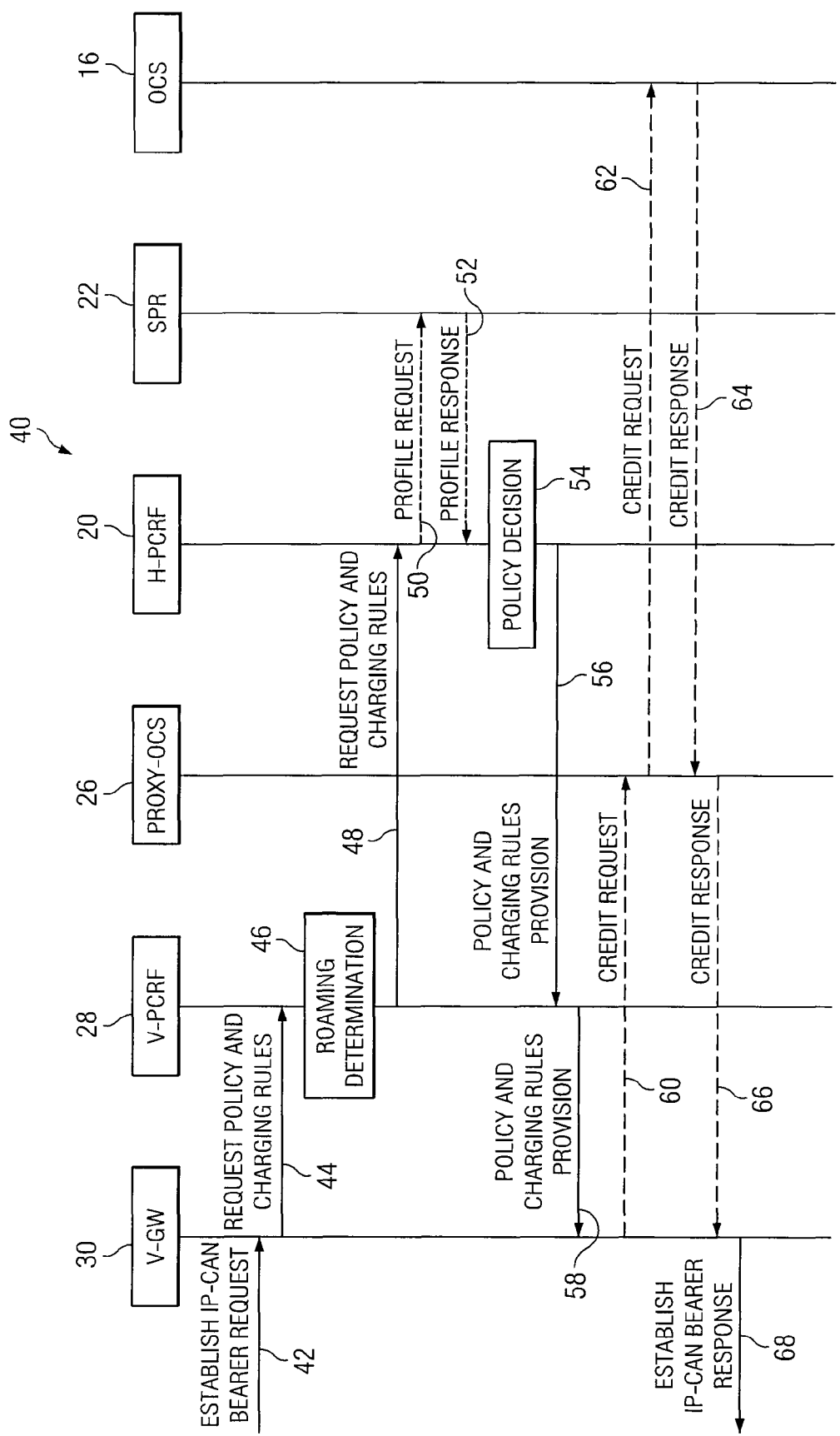
FIG. 2 is an example signalling flow for establishing a session to allow a policy and charging enforcement function (PCEF) in a visited network.

Referring to FIG. 2, an example signalling flow 40 for establishing a session to allow PCEF in visited network 14 is illustrated. In a particular embodiment of FIG. 2, the established session is an IP-CAN session. In the illustrated embodiment, the AF 18 is not involved in session establishment, although it should be understood that the AF 18 may be involved in session establishment in other embodiments. In step 42, the V-GW 30 receives a request for IP-CAN Bearer establishment from a user roaming in the visited network 14. In step 44, the V-GW 30 determines that PCC authorization is required, and sends a request to the V-PCRF 28 for authorization of one or more allowed services and PCC Rules information. In at least one embodiment, the V-GW 30 includes sufficient information in the request in order for the V-PCRF 28 to determine that the user is roaming. For example, the V-GW 30 may include the user's IMSI. In step 46, the V-PCRF 28 determines that PCC Authorization is required for a roaming user. In a particular embodiment, the V-PCRF 28 determines that PCC authorization is required by analyzing the Mobile Country Code (MCC) and/or Mobile Network Code (MNC) from the user's IMSI.

In step 48, the V-PCRF 28 send a request to the H-PCRF 20 for authorization of the allowed service(s) and PCC Rules information. In the request the V-PCRF 28 includes information regarding whether on-line charging for roaming subscribers is supported. In at least one embodiment, the V-PCRF 28 derives the identity of the H-PCRF 20 to which the request should be sent from the MCC and MNC information. In step 50, if the H-PCRF 20 does not have the subscriber's subscription profile related information, the H-PCRF 20 sends a profile request to the SPR 22 to provide the subscriber's subscription profile related information. In step 52, the SPR 22 responds with a profile response that contains the requested subscription profile related information that includes information about the allowed service(s), PCC Rules information, and information regarding whether on-line charging is necessary or desirable.

In step 54, the H-PCRF 20 makes an authorization and policy decision. In various embodiments, this decision may include denying the establishment of IP-CAN bearers for users of an on-line charging service if the visited network 14 does not support on-line charging for roaming users. In step 56, the H-PCRF 20 sends the policy and charging rules provision decision to the V-PCRF 28. In various embodiment, the H-PCRF 20 may also send charging keys to the V-PCRF 28. If on-line charging is required to be supported, the identity of the OCS 16 in the home network 12 is additionally provided. In step 58, the V-PCRF 28 sends the decision to the V-GW 30 (including the identity of the OCS 16 in the home network 12 when applicable) and the V-GW 30 enforces the decision.

If online charging is applicable, and at least one PCC rule was activated, the V-GW 30 requests credit from the proxy OCS 26 for any charging key of the activated PCC rules and any relevant input information for OCS decision in step 60. In various embodiments, the V-GW 30 may additionally include the identity of the OCS 16.

In step 62, if online charging is applicable, the proxy OCS 26 requests credit from the OCS 16 for any charging key of the activated PCC rules as well as and provide relevant input information for the OCS decision. In various embodiments, the proxy OCS 26 uses the identity of the OCS 16 provided by the V-GW 30. If online charging is applicable the OCS 16 provides the credit information to the proxy OCS 26 in step 64. In some embodiments, the OCS 16 may provide re-authorization triggers for each of the credits to the proxy OCS 26. In step 66, if online charging is applicable the proxy OCS 26 provides the credit information to the V-GW 30 as well as any re-authorization triggers for each of the credits.

If credit is available for at least one charging key and at least one PCC rule was activated, the V-GW 30 acknowledges the IP-CAN Bearer Establishment Request by sending an IP-CAN Bearer Establishment Response to the user in a step 68. In an embodiment in which online charging is not applicable the IP-CAN bearer establishment is accepted if at least one PCC rule was activated. In at least one embodiment, the V-GW 30 may assign an IP address for the user before sending the IP-CAN Bearer Establishment Response to the user.

Some of the steps discussed with reference to FIG. 2 may be changed or deleted where appropriate and additional steps may also be added to these process flows. These changes may be based on specific communication architectures or particular interfacing arrangements and configurations of associated elements and do not depart from the scope or the teachings of the present embodiments.

Figure 3:
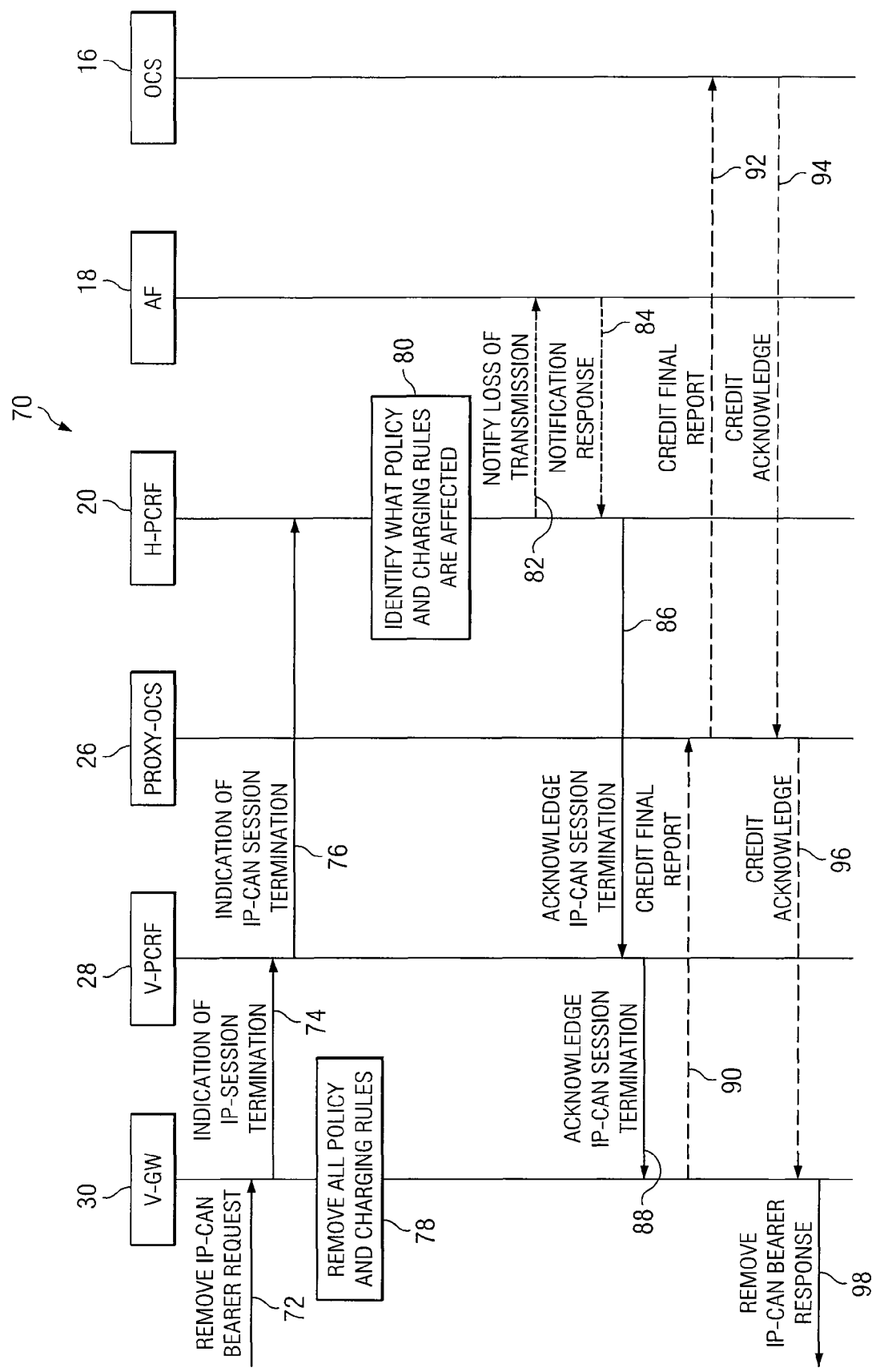
FIG. 3 is an example signalling flow for terminating a roaming session by a user.

Referring to FIG. 3, an example signalling flow 70 for terminating a roaming session by a user is illustrated. In a particular embodiment, the roaming session is an IP-CAN session. In step 72, V-GW 30 receives an IP-CAN request from a roaming user to remove an IP-CAN bearer for the roaming session. In embodiments in which there are multiple IP-CAN bearers associated with the roaming session, it is assumed that the last IP-CAN bearer associated with the IP-CAN session is to be removed. In step 74, the V-GW 30 sends an indication of IP-CAN session termination to the V-PCRF 28 indicating that the IP-CAN session is being removed. In step 76, the V-PCRF 28 sends the indication of IP-session termination to the H-PCRF 20. In step 78, the V-GW 30 removes all PCC Rules associated with the IP-CAN session.

In response to receiving the indication of IP-CAN session termination, in step 80 the H-PCRF 20 identifies the PCC Rules affected by the removal, and determines what service and associated transmission resources should be notified to the AF 18 due to the removal. In step 82, the H-PCRF 20 notifies the AF 18 of the loss of transmission resources for the service if the service is requested by the AF 18. The AF 18 acknowledges the notification of the loss of transmission resources by sending a notification response to the H-PCRF 20 in step 84. In step 86, the H-PCRF 20 removes the information related to the terminated IP-CAN Session and acknowledges to the V-PCRF 28 that the H-PCRF 20 handling of the IP-CAN session has terminated.

The V-PCRF 28 removes the information related to the terminated IP-CAN Session and acknowledges to the V-GW 30 that the V-PCRF 28 handling of the IP-CAN session has terminated in step 88. This acknowledgment is flagged by the V-GW 30 as the response to the remove IP-CAN bearer request.

If online charging is applicable, the V-GW 30 returns the remaining credit of every charging key to the proxy OCS 26 in step 90, and the proxy OCS returns the remaining credit of every charging key to the OCS 16 in a final credit report in step 92. The OCS 16 acknowledges the final credit report to the proxy OCS 26 in step 94, and the proxy OCS 26 acknowledges that final credit report to the V-GW 30 in step 96. In step 98, the V-GW continues the IP-CAN Bearer removal procedure by sending a remove IP-CAN bearer response to the user.

Some of the steps discussed with reference to FIG. 3 may be changed or deleted where appropriate and additional steps may also be added to these process flows. These changes may be based on specific communication architectures or particular interfacing arrangements and configurations of associated elements and do not depart from the scope or the teachings of the present embodiments.

Figure 4:
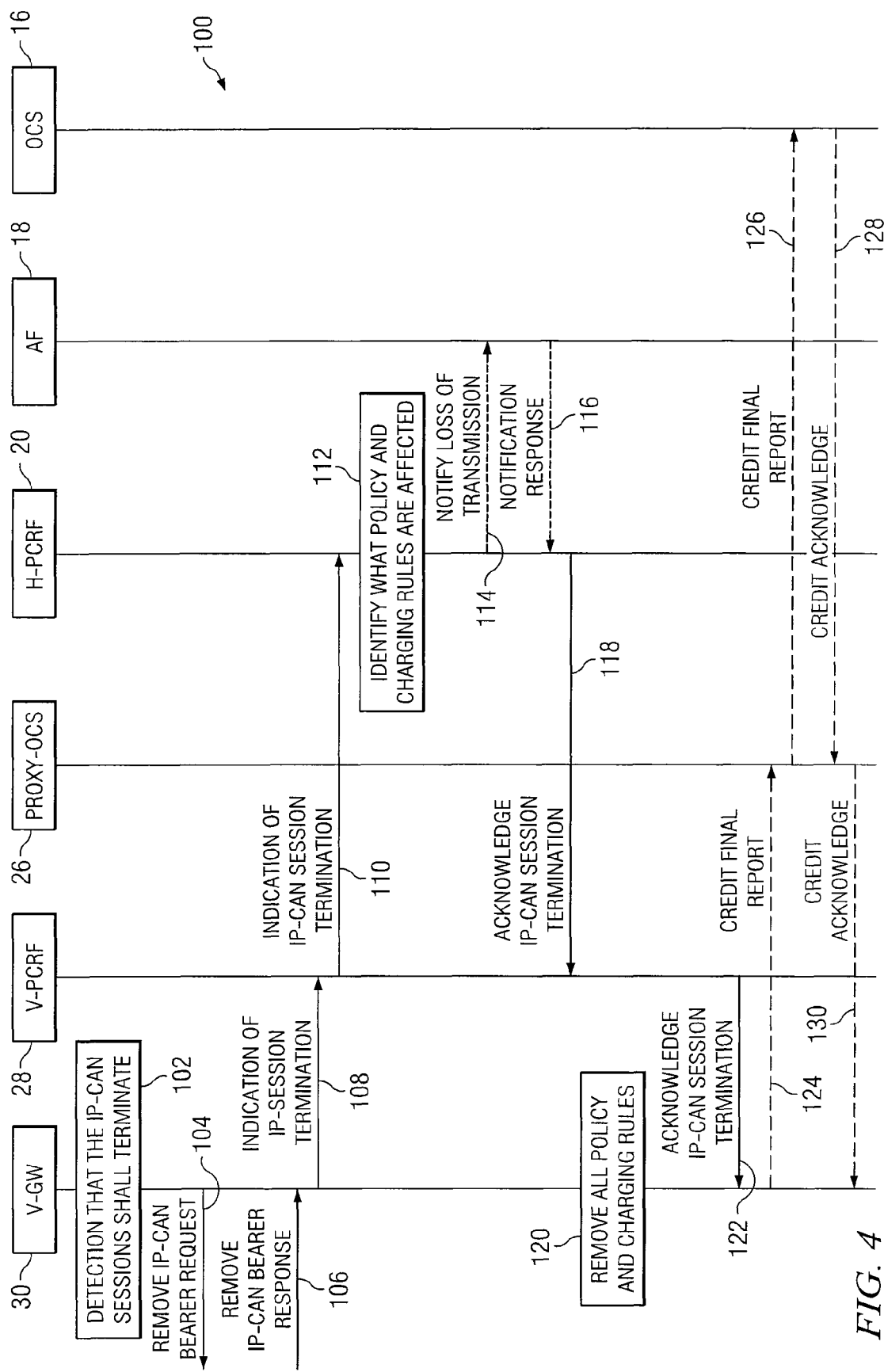
FIG. 4 is an example signalling flow for terminating a roaming session by a visited gateway.

Referring to FIG. 4, an example signalling flow 100 for terminating a roaming session by a visited gateway 30 is illustrated. In a particular embodiment, the roaming session is an IP-CAN session. In step 102, the V-GW 30 detects that IP-CAN session termination is required. In step 104, the V-GW 30 sends a request to a roaming user to remove the IP-CAN bearer associated with the roaming session. For IP-CAN with multiple IP-CAN bearers this has to be the last IP-CAN bearer associated to this IP-CAN session. In embodiments in which there are multiple IP-CAN bearers associated with the roaming session, it is assumed that the last IP-CAN bearer associated with the IP-CAN session is to be removed. In step 106, the V-GW 30 receives an IP-CAN bearer removal response from a roaming user.

In step 108, the V-GW 30 sends an indication of IP-CAN session termination to the V-PCRF 28 indicating that the IP-CAN session is being removed. In step 110, the V-PCRF 28 sends the indication of IP-session termination to the H-PCRF 20.

In response to receiving the indication of IP-CAN session termination, in step 112 the H-PCRF 20 identifies the PCC Rules affected by the removal, and determines what service and associated transmission resources should be notified to the AF 18 due to the removal. In step 114, the H-PCRF 20 notifies the AF 18 of the loss of transmission resources for the service if the service is requested by the AF 18. The AF 18 acknowledges the notification of the loss of transmission resources by sending a notification response to the H-PCRF 20 in step 116. In step 118, the H-PCRF 20 removes the information related to the terminated IP-CAN Session and acknowledges to the V-PCRF 28 that the H-PCRF 20 handling of the IP-CAN session has terminated. In step 120, the V-GW 30 removes all PCC Rules associated with the IP-CAN session.

The V-PCRF 28 removes the information related to the terminated IP-CAN Session and acknowledges to the V-GW 30 that the V-PCRF 28 handling of the IP-CAN session has terminated in step 122.

If online charging is applicable, the V-GW 30 returns the remaining credit of every charging key to the proxy OCS 26 in step 124, and the proxy OCS returns the remaining credit of every charging key to the OCS 16 in a final credit report in step 126. The OCS 16 acknowledges the final credit report to the proxy OCS 26 in step 128, and the proxy OCS 26 acknowledges that final credit report to the V-GW 30 in step 130.

Some of the steps discussed with reference to FIG. 4 may be changed or deleted where appropriate and additional steps may also be added to these process flows. These changes may be based on specific communication architectures or particular interfacing arrangements and configurations of associated elements and do not depart from the scope or the teachings of the present embodiments.

Figure 5:
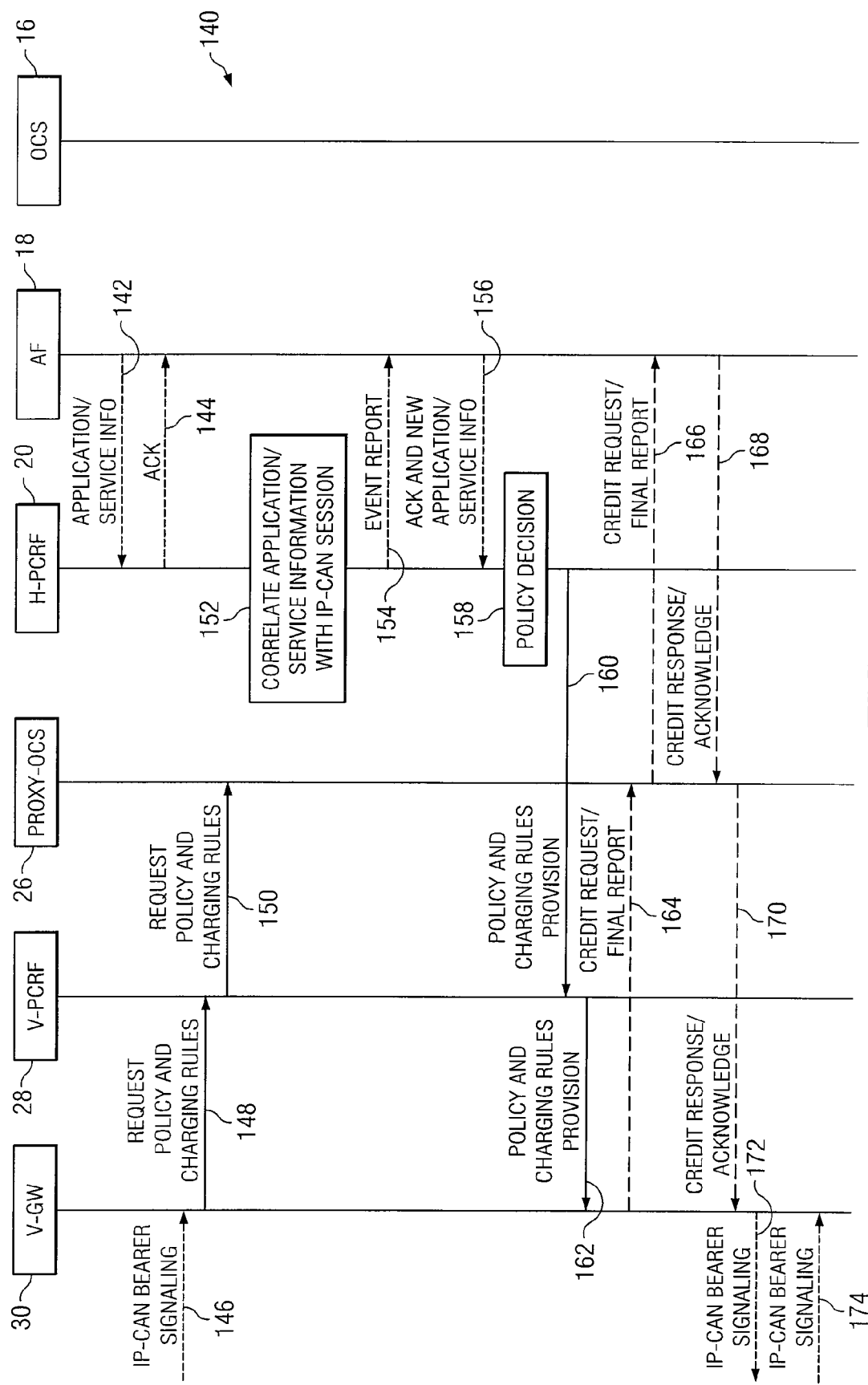
FIG. 5 is an example signalling flow for visited gateway initiated modification of a roaming session.

Referring to FIG. 5, an example signalling flow 140 for visited gateway initiated modification of a roaming session is illustrated. In the illustrated embodiment, V-GW 30 initiates a modification of a roaming session that has been established with a user. In a particular embodiment, the roaming session is an IP-CAN session. Examples of these modifications include IP-CAN bearer establishment and termination, as well as modification if triggering conditions provided to the V-GW 30 are fulfilled. In some embodiments, the AF 18 may be involved. An example of this scenario is authorization of a session-based service for which an IP-CAN Session is also modified.

In optional step 142, the AF 18 provides application/service information to the H-PCRF 20 via AF session signalling, and in optional step 144 the H-PCRF 20 stores the application/service information and responds with an acknowledgement to the AF 18. In step 146, the V-GW 30 receives an IP-CAN bearer signalling message indicating a request for IP-CAN Bearer establishment, modification or termination. In other embodiments, instead of performing step 146, the V-GW 30 may make an internal decision to make a modification to the session. In step 148, the V-GW 30 determines that PCC interaction is required and sends a PCC Rules request to the V-PCRF 28. If there is a limitation or termination of transmission resources for a PCC Rule, the V-GW 30 reports this to the H-PCRF 20.

In step 150, the V-PCRF 28 sends the PCC Rules request to the H-PCRF 20, and the H-PCRF correlates the request for PCC Rules with the IP-CAN session and service information available at V-GW 30 in step 152. In an optional step 154, the H-PCRF 20 may report an event related to the transmission resources to the AF 18. In an optional step 154, the AF 18 may acknowledge the event report and/or respond to the H-PCRF 20 with requested information, such as information related to a new application/service. In step 158, the H-PCRF 20 makes an authorization and policy decision regarding the requested modification. In step 160, the H-PCRF 20 sends the decision to the V-PCRF 28. In step 162, the V-PCRF 28 sends the decision to the V-GW 30, and the V-GW 30 enforces the decision.

If online charging is applicable, the V-GW 30 requests credit from and/or returns remaining credit to the Proxy-OCS 26 in step 164, and the Proxy-OCS 26 request credit from and/or returns remaining credit to the OCS 16 in a step 168. If online charging is applicable, the OCS 16 provides the credit information to the Proxy-OCS 26, and/or acknowledges the credit report in step 168. In step 170, the Proxy-OCS provides the credit information and/or acknowledges the credit report to the V-GW 30.

In step 172, the V-GW 30 acknowledges or rejects any IP-CAN bearer signalling received in step 146. In at least one embodiment, the IP-CAN bearer establishment or modification is accepted if at least one PCC rule is active for the IP-CAN bearer, and in the case of online charging, if credit is available for at least one charging key. Otherwise, the IP-CAN bearer establishment or modification is rejected. In at least one embodiment, an IP-CAN bearer termination is always acknowledged by the V-GW 30. In the case of an internal decision by the V-GW 30 to modify the session, the V-GW 30 initiates any IP-CAN bearer signaling required for completion of the IP-CAN Session modification in step 174.

Some of the steps discussed with reference to FIG. 5 may be changed or deleted where appropriate and additional steps may also be added to these process flows. These changes may be based on specific communication architectures or particular interfacing arrangements and configurations of associated elements and do not depart from the scope or the teachings of the present embodiments.

Figure 6:
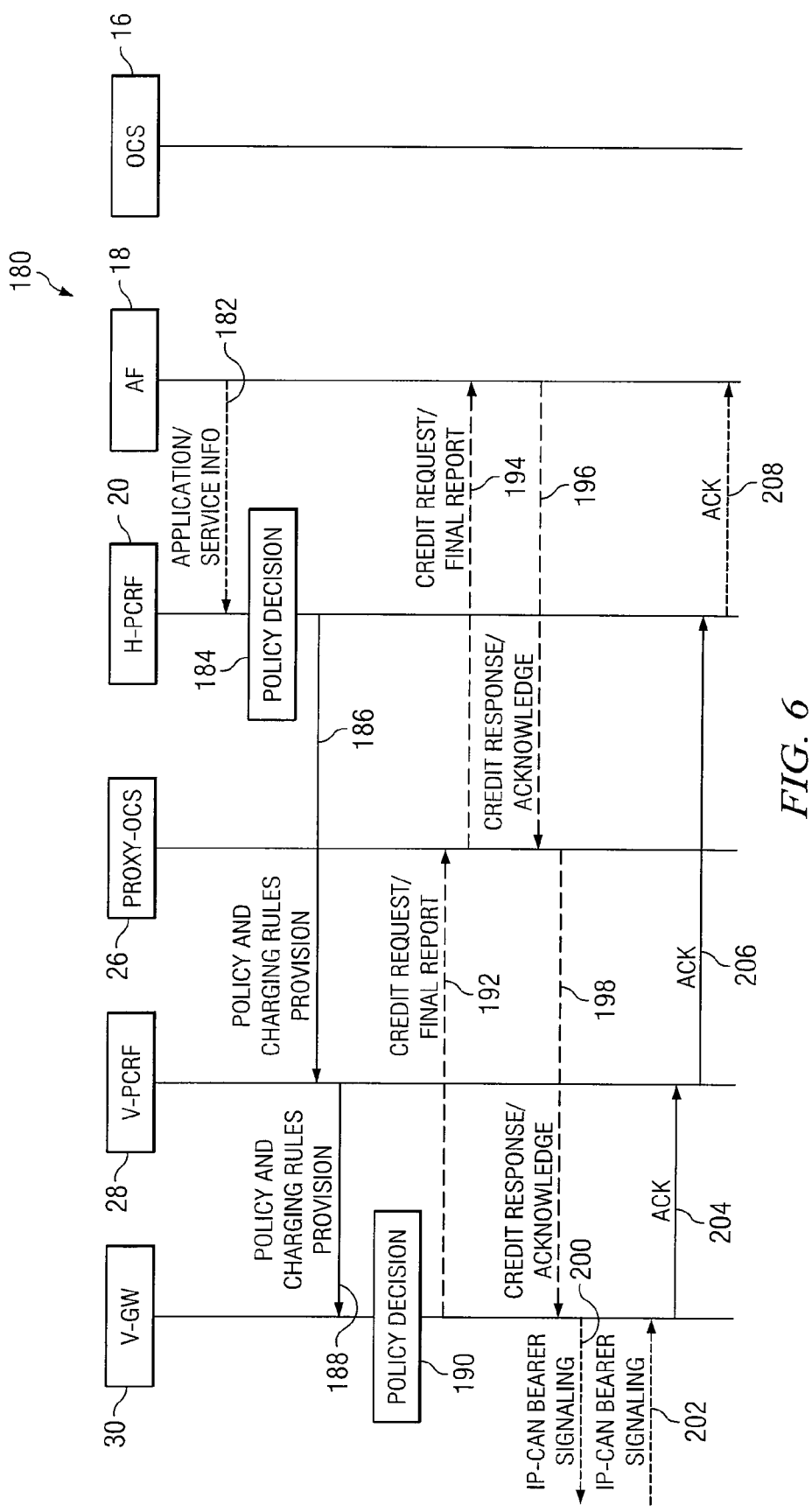
FIG. 6 is an example signalling flow for a home policy and charging rules function (H-PCRF) initiated modification of a roaming session.

Referring now to FIG. 6, an example signalling flow 180 for H-PCRF initiated modification of a roaming session is illustrated. In the illustrated embodiment, H-PCRF 20 initiates a modification of a roaming session that has been established with a user. In a particular embodiment, the roaming session is an IP-CAN session. In various embodiments, the AF 18 may be involved in the modification of the roaming service, while in other embodiments the AF 18 may not be involved. An example scenario includes initiation and authorization of a session-based service for which an IP-CAN Session is modified. In various embodiments, IP-CAN Session handling and handling of PCC rules for non-session based services, and general handling of PCC rules that are not subject to AF-interaction is also applicable.

In optional step 182, the AF 18 provides application/service information to the H-PCRF 20 via AF session signalling. In step 184, the H-PCRF 20 makes an authorization and policy decision. In step 186, the H-PCRF 20 sends the decision to the V-PCRF 28, and the V-PCRF 28 sends the decision to the V-GW 30 in step 188. In step 190, the V-GW 30 enforces the decision.

If online charging is applicable, the V-GW 30 requests credit from and/or returns remaining credit to the proxy-OCS 26 in step 192, and the proxy-OCS requests the credit from and/or returns the remaining credit to the OCS 16 in step 194. If online charging is applicable, the OCS 16 provides the credit information and/or acknowledges the credit report to the to the proxy-OCS 26 in step 196, the proxy-OCS 16 provides the credit information and/or acknowledges the credit report to the V-GW 30 in step 198.

In optional step 200, the V-GW 30 may send an IP-CAN Bearer modification or termination request using IP-CAN bearer signalling. In at least one embodiment, an IP-CAN bearer modification is sent by the V-GW 30 if the QoS of the IP-CAN bearer exceeds the authorized QoS provided by the V-PCRF 28. In some embodiments, an IP-CAN bearer termination request is sent by the V-GW 30 if all PCC rules for an IP-CAN bearer have been removed. In an optional step 202, the V-GW 30 receives a response for the IP-CAN Bearer modification or termination request.

In step 204, the GW sends an acknowledgement to the V-PCRF 28, and the V-PCRF sends the acknowledgement to the H-PCRF 20 in step 206. In an optional step 208, the H-PCRF 20 stores application/service information and sends an acknowledgement to the AF 18.

Some of the steps discussed with reference to FIG. 6 may be changed or deleted where appropriate and additional steps may also be added to these process flows. These changes may be based on specific communication architectures or particular interfacing arrangements and configurations of associated elements and do not depart from the scope or the teachings of the present embodiments.

Figure 7:
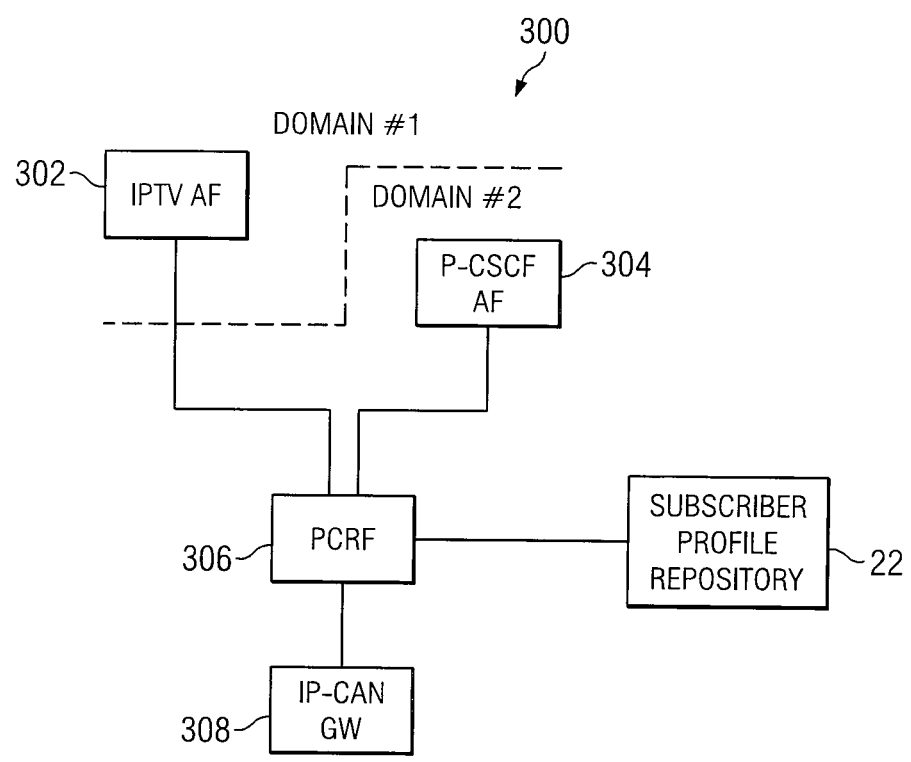
FIG. 7 is a simplified block diagram of an embodiment of a system for policy and charging rule prioritization.

Referring to FIG. 7, a simplified block diagram of an embodiment of a system 300 for policy and charging rule prioritization is illustrated. The system 300 includes an internet protocol television (IPTV) application function (AF), located in Domain #1, delivering an internet an IPTV service. The system 300 further includes a Proxy Call Session Control Function (P-CSCF) AF 304, a policy and charging rules function (PCRF) 306, a subscriber profile repository (SPR) 22, and an IP-CAN gateway (GW) 308 located in Domain #2.

A Policy and charging control rule (PCC rule) includes the information that is required to enable the user plane detection of, the policy control and proper charging for a service data flow. The packets detected by applying the service data flow template are designated as a service data flow. In various embodiments, two different types of PCC rules exist: Dynamic rules and predefined rules. The dynamic rules are provisioned by the PCRF 306, while the predefined rules are preconfigured in a PCEF. There are defined procedures for activation, modification and deactivation of PCC rules. The PCRF 306 may activate, modify and deactivate a PCC rule at any time. In various embodiments, the modification procedure is applicable to dynamic PCC rules only. In various embodiments, an operator defines the PCC rules.

Table 3 lists examples of information contained in a PCC rule, including the information name, the description and whether the PCRF may modify this information in a dynamic PCC rule in the PCEF. The Category field indicates if a certain piece of information is mandatory or not for the construction of a PCC rule, i.e. if it is possible to construct a PCC rule without it.

TABLE 3

The PCC Rule Information

| Information name | Description | Category | PCRF permitted to modify for a dynamic PCC rule in the PCEF |
|---|---|---|---|
| Rule identifier | Uniquely identifies the PCC rule, within an IP-CALN session. It is used between PCRF and PCEF for referencing PCC rules. | Mandatory | no |
| Service data flow detection | This section defines the method for detecting packets belonging to a service data flow. | | |
| Precedence | Determines the order, in which the service data flow templates are applied at service data flow detection. | Mandatory | yes |
| Service data flow template | A list of service data flow filters for the detection of the service data flow. | Mandatory | yes |
| Charging | This section defines identities and instructions for charging and accounting that is required for an access point where flow based charging is configured | | |
| Charging key | The charging system (OCS or OFCS) uses the charging key to determine the tariff to apply for the service data flow. | | yes |
| Service identifier | The identity of the service or service component the service data flow in a rule relates to. | | yes |
| Charging method | Indicates the required charging method for the PCC rule. Values: online, offline or neither. | Mandatory | no |
| Measurement method | Indicates whether the service data flow data volume, duration or both shall be measured. This is applicable for reporting, regardless the charging method. | | yes |
| Application Function Record Information | An identifier, provided from the AF, correlating the measurement for the Charging key/Service identifier values in this PCC rule with application level reports. | | no |

TABLE 3-continued

The PCC Rule Information

| Information name | Description | Category | PCRF permitted to modify for a dynamic PCC rule in the PCEF |
|---|---|---|---|
| Service identifier level reporting | Indicates that separate usage reports shall be generated for the Service identifier. Values: mandated or not required | | Yes |
| Policy control | This section defines how the PCEF shall apply policy control for the service data flow. | | |
| Gate status | The gate status indicates whether the service data flow, detected by the service data flow template, may pass (Gate is open) or shall be discarded (Gate is closed) at the PCEF. | | Yes |
| QoS class identifier | The authorized QoS class for the service data flow | | Yes |
| UL-bitrate | The uplink bit-rate authorized for the service data flow | | Yes |
| DL-bitrate | The downlink bit-rate authorized for the service data flow | | Yes |
| Establishment Priority | The priority for handling conflicts which otherwise would cause a subscriber's authorized QoS to be exceeded | | No |
| Retention Priority | The priority for handling conflicts which otherwise would cause a subscriber's authorized QoS to be exceed | | No |
| Priority Offset | A value which is added to the establishment priority when comparing with the retention priority of a PCC rule associated with a common application identifier | | No |

The PCC Rule identifier is unique for a PCC rule within an IP-CAN session. A dynamically provided PCC rule that has the same Rule identifier value as a predefined PCC rule replaces the predefined rule within the same IP-CAN session.

A PCC Service data flow template may comprise any number of Service data flow filters. A Service data flow filter contains information for matching user plane packets. A Service data flow filter, provided from the PCRF 306, contains information elements for matching against the IP 5-tuple. The Service data flow template filtering information within an activated PCC rule is applied at the PCEF to identify the packets belonging to a particular service data flow. Predefined PCC rules may include service data flow filters, which support extended capabilities, including enhanced capabilities to identify packets associated with application protocols.

PCC Precedence defines in what order the activated PCC rules within the same IP-CAN session shall be applied at the PCEF for service data flow detection. When a dynamic PCC rule and a predefined PCC rule have the same precedence, the dynamic PCC rule takes precedence.

For downlink packets all the service data flow templates, activated for an IP-CAN session shall be applied for service data flow detection and for the mapping to the correct IP-CAN bearer. For uplink packets the service data flow templates activated on their IP-CAN bearer shall be applied for service data flow detection. The PCC Charging key is the reference to the tariff for the service data flow. Any number of PCC Rules may share the same charging key value. The charging key values for each service are operator configurable. Assigning the same Charging key for several service data flows implies that the charging does not require the credit management to be handled separately.

A PCC Service identifier identifies a particular service. PCC Rules may share the same service identifier value. The service identifier provides the most detailed identification, specified for flow based charging, of a service data flow.

A PCC Charging method indicates whether online charging is required, offline charging suffices or the service data flow is not subject to any end user charging. A PCC Measurement method indicates what measurements apply for charging for PCC rule. A PCC Service Identifier Level Reporting indicates whether the PCEF shall generate reports per Service Identifier. The PCEF accumulates the measurements from all PCC rules with the same combination of Charging key/Service identifier values in a single report.

A PCC Application function record information identifies an instance of service usage. A subsequently generated usage report, generated as a result of the rule, may include the Application function record information, if available. The Application Function Record Information may contain the AF Charging Identifier and/or the Flow identifiers. The report is however not restricted to include only usage related to the Application function record information reported, as the report accumulates the usage for all PCC rules with the same combination of Charging key/Service identifier values. If exclusive charging information related to the Application function record information is required, the PCRF shall provide a service identifier, not used by any other PCC rule of the IP-CAN session at this point in time, for the AF session.

For example, the PCRF 306 may be configured to maintain a range of service identifier values for each service which, require exclusive per instance charging information. Whenever a separate counting or credit management for an AF session is required, the PCRF shall select a value, which is not used at this point in time, within that range. The uniqueness of the service identifier in the PCEF ensures a separate accounting/credit management while the AF record information identifies the instance of the service.

A PCC Gate indicates whether the PCEF will let a packet matching the PCC Service data flow template, pass through (gate is open) the PCEF or if the PCEF will discard the packet in various embodiments, a packet, matching a PCC Rule with an open gate, may be discarded due to credit management reasons.

A QoS Class Identifier indicates the authorized QoS class for the service data flow. A UL-bitrate indicates the authorized bitrate for the uplink component of the service data flow. The interpretation of the bitrate depends on the QoS class and the IP-CAN. A DL-bitrate indicates the authorized bitrate for the downlink component of the service data flow. The interpretation of the bitrate depends on the QoS class and the IP-CAN. An Establishment-Priority indicates an integer used for rule prioritization and conflict handling. A Retention-Priority indicates an integer used for rule prioritization and conflict handling. A Priority-Offset is used for rule prioritization and conflict handling. It indicates an integer which is added to the Establishment-Priority before comparing with Retention-Priority values for dynamic PCC rules established by the same Application Identifier.

Policy and charging control rule operations include activation, modification and de-activation of PCC rules. Activation of a dynamic PCC rule provides the PCC rule information to the PCEF. Activation of a predefined PCC rule provides an identifier of the relevant PCC rule to the PCEF. Activation of a predefined PCC rule, not known in the PCRF 306, may be done by the PCEF based on operator policy. The PCRF 306 may, at any time, modify an active, dynamic PCC rule. The PCRF 306 may, at any time, deactivate an active PCC rule in the PCEF. At IP-CAN bearer termination, in at least one embodiment all active PCC rules on that bearer are deactivated without explicit instructions from the PCRF 306 to do so.

The purpose of the IP-CAN bearer and IP-CAN session related policy information is to provide policy and charging control related information that is applicable to a single IP-CAN bearer or the whole IP-CAN session, respectively. The PCRF 306 provides the IP-CAN bearer and IP-CAN session related policy information to the PCEF using the PCC rule provision procedure. The IP-CAN bearer related policy information may be provided together with PCC rules or separately.

Table 4 lists examples of PCC related IP-CAN bearer and IP-CAN session related policy information.

TABLE 4

PCC related IP-CAN bearer and IP-CAN session related policy information

| Attribute | Description | PCRF permitted to modify the attribute | Scope |
|---|---|---|---|
| Charging information | Defines the containing OFCS and/or OCS addresses. | No | IP-CAN session |
| Event trigger | Defines the event(s) that shall cause a re-request of PCC rules for the IP-CAN bearer. | Yes | IP-CAN session |
| Authorized QoS | Defines the maximum authorised QoS for the IP-CAN bearer. | Yes | IP-CAN bearer |
| Establishment Priority | Defines IP-CAN specific QoS Pre-emption | Yes | IP-CAN bearer |

Upon the initial interaction with the PCEF, the PCRF 306 may provide Charging information containing OFCS and/or OCS addresses to the PCEF defining the offline and online charging system addresses respectively. These will override any possible predefined addresses at the PCEF.

Upon every interaction with the PCEF, the PCRF 306 may provide event triggers for the IP-CAN session. Event triggers are used to determine which IP-CAN bearer modification causes the PCEF to re-request charging rules.

An authorized QoS provides an upper bound on the resources that can be reserved or allocated for the IP-CAN bearer. The authorized QoS applies for an IP-CAN bearer and may be included to the initial or to subsequent PCC rule provisioning procedures. The Policy Offset provides the PCEF with the ability to implement QoS enforcement and pre-emption mechanisms.

In an example PCC prioritization procedure A user has an IPTV service delivered from a third party provider by the IPTV AF 302. At IP session establishment, the user's subscriber's profile is downloaded to the PCRF 306 indicating an allowed QoS of 128 kbit/s The IPTV AF 302 provides session information related to a streaming service. The request is identified by a Application Identifier of the IPTV provider and is for a high quality sports stream at 128 kbit/s. A mobile terminated session is established. The P-CSCF AF 304 provides session related information related to the negotiated media. The request is identified by a P-CSCF AF Application identified and a Communications Service Identifier with bandwidth of 20 kbit/s. The PCRF 306 will optionally be able to handle policy conflicts/interactions between services which otherwise would result in exceeding a subscriber's allowed QoS.

In an embodiments of a procedure for handling PCRF 306 conflicts, the information stored in the SPR 22 is augmented to include a list of application identifiers and/or AF communication Service Identifiers authorized for a particular subscriber. In addition, associated with each of the above identifiers stored in the SPR 22 is an establishment priority and a retention priority. These priorities are used to resolve PCRF 306 conflicts, in particular when the establishment of simultaneous service data flows would cause a subscriber's allowed QoS to be exceeded. This then provides a procedure for handling priority in the case of network overload situations.

Although in one embodiment the AF provided priority is used primarily at the IP-CAN specific bearer level, it can also be used to additionally provide a priority offset between for service requests with the same application identifier.

In an example of pre-empted IPTV, at IP session establishment, the user's subscriber's profile is downloaded from the SPR 22 to the PCRF 306 indicating an allowed maximum combined streaming and conversational rate of 150 kbit/s. Four service identifiers are downloaded from the SPR 22:

Service#1:
Application Identifier: "IPTV Application"
Service Identifier: " "
Establishment Priority: 50
Retention Priority: 70
Service#2:
Application Identifier: "P-CSCF Application"
Service Identifier: "MMTel"
Establishment Priority: 80
Retention Priority: 100
Service#3:
Application Identifier: "P-CSCF Application"
Service Identifier: "PoC"
Establishment Priority: 80
Retention Priority: 100
Service#4:
Application Identifier: "P-CSCF Application"
Service Identifier: " "
Establishment Priority: 70
Retention Priority: 90

The IPTV AF provides service related information with a required bandwidth of 128 kbit/s. The PCRF 306 matches the request against Service #1 and since the requested bandwidth is less than the maximum rate, the PCRF 306 authorizes the request and requests establishment of appropriate policy enforcement by the IP-CAN GW 308. The user starts a Push-To-Talk Over Cellular (PoC) session and the P-CSCF AF 304 provides service related information with a required bandwidth of 12 kbit/s. The PCRF 306 matches the request against Service #3 since this provides a matching application and service identifiers. Since the requested bandwidth together with already established media is less than the maximum rate, the PCRF 306 authorizes the request and requests establishment of appropriate policy enforcement by the IP-CAN GW 308.

The user receives an incoming Multi-Media Telephony (MMTel) session and accepts the "call". The P-CSCF AF 304 provides service related information with a required bandwidth of 12 kbit/s. The PCRF 306 matches the request against Service #2. Since now the requested bandwidth together with already established media is 152 kbit/s and greater than the authorized maximum, the PCRF 306 uses the establishment priority of MMTel and compares it to the retention priority of the already established sessions. In this case, the PCRF 306 can determine that the IPTV session is to be pre-empted since the MMTel establishment priority is greater than the IPTV retention priority. The PCRF 306 indicates the IPTV AF 302 that was previously committed for resources can no longer be fulfilled. The PCRF 306 initiates the modification of the policy and charging rules in the IP-CAN Gateway.

In an example of Pre-empted MMTel, at IP session establishment, the user's subscriber profile is downloaded from the SPR 22 to the PCRF 306 indicating an allowed maximum combined streaming and conversational rate of 40 kbit/s. Three service identifiers are downloaded from the SPR 22:

Service#1:
Application Identifier: "P-CSCF Application"
Service Identifier: "MMTel"
Establishment Priority: 80
Retention Priority: 100
Service#2:
Application Identifier: "P-CSCF Application"
Service Identifier: "PoC"
Establishment Priority: 80
Retention Priority: 100
Service#3:
Application Identifier: "P-CSCF Application"
Service Identifier: " "
Establishment Priority: 70
Retention Priority: 90

The user starts a PoC session and the P-CSCF AF 304 provides service related information with a required bandwidth of 12 kbit/s. The PCRF 306 matches the request against Service #2 since this provides a matching application and service identifiers. Since the requested bandwidth is less than the maximum rate, the PCRF 306 authorizes the request, and requests establishment of appropriate policy enforcement by the IP-CAN GW 308. The user receives an incoming MMTel session and accepts the "call". The P-CSCF 306 provides service related information with a required bandwidth of 20 kbit/s. The PCRF 28 matches the request against Service #1. Since the requested bandwidth together with the already active sessions is less than the maximum rate, the PCRF 306 authorizes the request and request establishment of appropriate policy enforcement by the IP-CAN GW 308.

A user originates an emergency call. The P-CSCF 306 provides service information with the AF identified as "P-CSCF Application" and a Priority of 100. The PCRF 308 matches the request against Service #3. Normally this establishment priority of Service #3 would mean that the request is not authorized, but the PCRF 308 can use the priority in the AF provided service information to compare against sessions from the same Application Identifier. The additional 100 Priority is added to the SPR 22 provided priority, meaning that the emergency call will pre-empt either the MMTel or the PoC session.

Thus, various embodiments provide for Policy and Charging Convergence in which priority handling is defined on a per service identity basis.

Although embodiments been described in detail with reference to particular embodiments, system 300 may be extended to any scenario in which it is desirable to implement rule prioritization for policy and/or charging control. This may also be extended to any other network signaling protocols to achieve the teachings of the present embodiments. Moreover, significant flexibility is provided by system 300 in that any suitable one or more components may be replaced with other components that facilitate their operations, as outlined herein.

Software and/or hardware may reside in system 300 in order to achieve the teachings of the features of the present embodiments. Note that, due to their flexibility, these components may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of the components in the context of system 300 and, accordingly, they should be construed as such.

It should be noted that the internal structure of the system of FIG. 7 is versatile and can be readily changed, modified, rearranged, or reconfigured in order to achieve its intended operations or additional operations. Additionally, any of the items within FIG. 7 may be combined, where appropriate, or replaced with other functional elements that are operable to achieve any of the operations described herein.

A component of system 300 may include any suitable arrangement of elements, for example, an interface, logic, memory, other suitable element, or a combination of any of the preceding. An interface receives input, sends output, processes the input and/or output, performs other suitable operation, or performs a combination of any of the preceding. An interface may comprise hardware and/or software.

Logic performs the operations of the component, for example, executes instructions to generate output from input. Logic may include hardware, software, other logic, or a combination of any of the preceding. Certain logic, such as a processor, may manage the operation of a component. Examples of a processor include one or more computers, one or more microprocessors, one or more applications, other logic, or a combination of any of the preceding.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable medium, or a combination of any of the preceding.

Additionally, although described in specific environments and contexts, the present embodiments could be used in countless applications. Numerous other changes, substitutions, variations, alterations, and modifications may be ascertained by those skilled in the art and it is intended that the present embodiments encompass all such changes, substitutions, variations, alterations, and modifications as falling within the spirit and scope of the appended claims. Moreover, the present embodiments are not intended to be limited in any way by any statement in the specification that is not otherwise reflected in the appended claims.

Although several embodiments have been described, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An apparatus comprising:
   a memory operable to store a policy for a subscriber, the policy defining an authorized limit for the subscriber, the policy defining an establishment priority, a retention priority, and a priority offset for each application of a plurality of applications identified by a set of application identifiers; and
   one or more processors operable to:
      determine that a requested bearer of a requesting application and one or more existing bearers of one or more existing applications exceed the authorized limit;
      determine whether the establishment priority plus the priority offset for the requesting application is less than each of the one or more retention priorities of the one or more existing applications;
      if the establishment priority plus the priority offset is less than each of the one or more retention priorities, reject the request for the requested bearer for the requesting application; and
      if the establishment priority plus the priority offset is greater than at least one retention priority, pre-empt the at least one existing application associated with the at least one retention priority to allow for the requested bearer for the requesting application.

2. The apparatus of claim 1, wherein the establishment and retention priorities are qualified with one or more bearer specific attributes.

3. The apparatus of claim 1, wherein the policy defines one or more limits on a plurality of simultaneous bearers that are authorized to be activated by the subscriber to the policy.

4. The apparatus of claim 1, wherein the policy further defines one or more bandwidth limits per access type.

5. The apparatus of claim 1, further comprising:
   an interface in communication with a policy enforcement function operable to execute an IP session to establish a policy session for the policy.

6. The apparatus of claim 1, further comprising:
   an interface in communication with a policy repository and operable to:
   contact the policy repository, and
   receive the policy from the policy repository.

7. A method comprising:
   accessing a policy for a subscriber, the policy defining an authorized limit for the subscriber, the policy defining an establishment priority, a retention priority, and a priority offset for each application of a plurality of applications identified by a set of application identifiers; and
   determining, by one or more processors, that a requested bearer of a requesting application and one or more existing bearers of one or more existing applications exceed the authorized limit;
   determining, by the one or more processors, whether the establishment priority plus the priority offset for the requesting application is less than each of the one or more retention priorities of the one or more existing applications;
   if the establishment priority plus the priority offset is less than each of the one or more retention priorities, rejecting, by the one or more processors, the request for the requested bearer for the requesting application; and
   if the establishment priority plus the priority offset is greater than at least one retention priority, pre-empting, by the one or more processors, the at least one existing application associated with the at least one retention priority to allow for the requested bearer for the requesting application.

8. The method of claim 7, wherein the establishment and retention priorities are qualified with one or more bearer specific attributes.

9. The method of claim 7, wherein the policy defines one or more limits on a plurality of simultaneous bearers that are authorized to be activated by the subscriber to the policy.

10. The method of claim 7, wherein the policy further defines one or more bandwidth limits per access type.

11. The method of claim 7, further comprising:
    executing, by a policy enforcement function, an IP session to establish a policy session for the policy.

12. The method of claim 7, further comprising:
    contacting a policy repository; and
    receiving the policy for the subscriber.

13. One or more non-transitory computer readable media comprising logic when executed by one or more processors operable to:
  access a policy for a subscriber, the policy defining an authorized limit for the subscriber, the policy defining an establishment priority, a retention priority, and a priority offset for each application of a plurality of applications identified by a set of application identifiers; and
  determine that a requested bearer of a requesting application and one or more existing bearers of one or more existing applications exceed the authorized limit;
  determine whether the establishment priority plus the priority offset for the requesting application is less than each of the one or more retention priorities of the one or more existing applications;
  if the establishment priority plus the priority offset is less than each of the one or more retention priorities, reject the request for the requested bearer for the requesting application; and
  if the establishment priority plus the priority offset is greater than at least one retention priority, pre-empt the at least one existing application associated with the at least one retention priority to allow for the requested bearer for the requesting application.

14. The media of claim 13, wherein the establishment and retention priorities are qualified with one or more bearer specific attributes.

15. The media of claim 13, wherein the policy defines one or more limits on a plurality of simultaneous bearers that are authorized to be activated by the subscriber to the policy.

16. The media of claim 13, wherein the policy further defines one or more bandwidth limits per access type.

17. The media of claim 13, further operable to:
  communication with a policy enforcement function operable to execute an IP session to establish a policy session for the policy.

18. The media of claim 13, further operable to:
  contact a policy repository; and
  receive the policy from the policy repository.

* * * * *